United States Patent
Braun et al.

(12)

(10) Patent No.: US 6,237,213 B1
(45) Date of Patent: May 29, 2001

(54) PROCESS OF MANUFACTURING AN ELECTRICAL ROTATING ACTUATOR SUCH AS FOR USE IN WEAVING LOOMS AND WEAVING SYSTEMS

(75) Inventors: Dominique Braun, Faverges; Pierre Bourgeaux, Poisy; Patrick Iltis, Saint-Jorioz, all of (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 09/218,300

(22) Filed: Dec. 22, 1998

(30) Foreign Application Priority Data

Dec. 24, 1997 (FR) .................................................. 97 16738

(51) Int. Cl.$^7$ .................................................. H02K 15/02
(52) U.S. Cl. ................................ 29/596; 310/42; 310/216
(58) Field of Search ............................ 29/596, 598, 609, 29/605; 310/42, 216, 217

(56) References Cited

U.S. PATENT DOCUMENTS

| | | |
|---|---|---|
| 2,792,510 | 5/1957 | De Wolf . |
| 3,502,922 | 3/1970 | Welker . |
| 5,069,256 | 12/1991 | Goodman, Jr. . |
| 5,619,086 | 4/1997 | Steiner . |
| 5,859,486 | * 1/1999 | Nakahara et al. .................... 310/216 |

FOREIGN PATENT DOCUMENTS

| | | |
|---|---|---|
| 7908193 | 1/1983 | (DE) . |
| 56112857 | 9/1981 | (EP) . |
| 61167360 | 7/1986 | (EP) . |
| 0353005 | 1/1990 | (EP) . |
| 0750061 | 12/1996 | (EP) . |
| 09268450 | 10/1997 | (EP) . |
| 01252141 | * 6/1989 | (JP) . |
| WO 9733024 | 9/1997 | (WO) . |

* cited by examiner

Primary Examiner—Carl E. Hall
(74) Attorney, Agent, or Firm—Dowell & Dowell, P.C.

(57) ABSTRACT

A method of forming a stator for an electrical actuator of a type which may be used in weaving looms and weaving systems wherein a stack of armature plates having two-spaced sections are initially wrapped with an electrically conductive wire to create two coils afterwhich the stack is folded to sever severable bridge elements of the stack and to form an armature to include a tubular housing for a rotor.

4 Claims, 4 Drawing Sheets

PROCESS OF MANUFACTURING AN ELECTRICAL ROTATING ACTUATOR SUCH AS FOR USE IN WEAVING LOOMS AND WEAVING SYSTEMS

BACKGROUND OF THE INVENTION

1. Field of the Invention

The present invention relates to an electrical actuator for forming the shed in a weaving loom, particularly for controlling the harness cords of a weaving system of the Jacquard type or the frames of a dobby, and to a process for manufacturing such an actuator. The invention also relates to a weaving system comprising such an actuator, and to a weaving loom equipped with such a system.

2. Brief Description of the Related Art

In weaving systems of the Jacquard type, it is known to drive, in phase opposition, two frames each bearing a plurality of griffes or horizontal knives 10 adapted to displace, vertically, hooks connected to the harness cords by a pulley or block mechanism. Mechanical or electromechanical devices are provided to immobilize these hooks along their vertical stroke. This known type of device necessitates considerable power for moving the griffe frames, which power is furnished by the drive shaft of the weaving loom, this leading to said loom being overdimensioned.

It is also known to use a rotating motor such as a step motor or a servomotor to control a small cord belonging to a weaving loom, linearly. Taking into account the large number of electric motors used in the weaving system associated with a weaving loom, a number which may attain and even exceed 10 000, these motors must be of minimum space requirement and cost, while having considerable reliability. In particular, winding of the conducting wire must be effected rapidly while guaranteeing a sufficient level of quality. In addition, the stator must have dimensions adapted to those of the rotor which, in order to optimize its inertia, must have a diameter which is as small as possible. Finally, the manufacturing tolerances of the metal plates constituting the stacks forming the stators must not hinder manufacture thereof nor reduce their yield.

It is an object of the present invention to propose an electrical rotating actuator adapted to control displacement of one or more harness cords, which is compact and simple to manufacture.

SUMMARY OF THE INVENTION

To that end, the invention relates to an electrical actuator for forming the shed in a weaving loom, particularly for controlling the harness cords of a weaving system of the Jacquard type or the frames of a dobby, comprising a rotor and at least one stator whose armature is formed by a stack of metal plates, characterized in that the stator is formed by at least two stator elements disposed side by side along the axis of rotation of the rotor, each stator element comprising two zones for reception of a winding of electrically conductive wire, at least certain of the metal plates of each zone disposed opposite one another being mated.

Thanks to the invention, it is possible to produce an electrical rotating actuator in which the electromagnetic flux circulating in the stator is optimum whatever the manufacturing tolerances of the plates constituting it and, in particular, whatever the variations in thickness existing in a batch of plates. In effect, the fact that the plates are mated, in the two zones of reception of the conducting wire winding, allows an efficient transfer of the electromagnetic flux from one zone towards the other.

According to a first advantageous aspect of the invention, the mated plates in each zone are formed from a single plate extending over the whole length of the armature. Thanks to this aspect of the invention, if one plate is thicker or thinner than its neighbors, this variation in thickness is found over the whole length of the armature and consequently in the two zones of reception of the electric wire winding. There is therefore no defect in alignment of the plates constituting the armatures, this promoting the electromagnetic flux.

According to another advantageous aspect of the invention, the plates comprise, in their central part and before the armature is shaped, a cleavable bridge connecting parts intended to be partially surrounded by said electrically conducting wire winding. Thanks to this aspect of the invention, the actuater is easy to manufacture and therefore of relatively low cost, insofar as the winding of the stator can be made flat, therefore at high speed, before the final geometry of the stator is attained by rupture of the cleavable bridge.

According to another advantageous aspect of the invention, each plate extends, in a direction substantially perpendicular to the cleavable bridge, by a finger, a finger of one plate extending from one side of the bridge that it comprises, while the fingers of the two adjacent plates extend, in the same direction, on the other side of the bridges that they comprise,. This construction of the cores or armatures of the stators allows a shaping of the stator, in order to produce the air gap, by wedging the fingers formed in the plates with respect to one another.

In that case, the fingers of the plates may be provided to be adapted to imbricate in one another, after rupture of the cleavable bridges. Such imbrication of the fingers of the plates forming the armatures of the stators allows a good electromagnetic contact therebetween and consequently a maximum conduction of the electromagnetic flux in the corresponding air gap.

The plates forming the stator elements are advantageously disposed head-to-tail. Thanks to this aspect of the invention, the distribution of the fingers on either side of the cleavable bridges may be obtained with one sole plate geometry, which greatly simplifies manufacture.

According to another advantageous aspect of the invention, the actuator comprises a base provided with two housings each adapted to receive a part of a stator, this base being provided with means for connecting each stator with pins for electrical supply of the said actuator. This base serves as bearing structure for the actuator according to the invention.

The invention also relates to a process for manufacturing an actuator as described hereinbefore and, more specifically, to a process characterized in that it consists in producing each stator element of the actuator by winding flat on an armature and in bending the latter in order to bring the ends closer together, a housing for reception of a rotor being formed by bringing these ends closer. Flat winding of the armatures may be effected at very high speed, possibly on a plurality of armatures disposed in parallel, this enabling the manufacturing costs to be minimized.

According to a first advantageous aspect of the process according to the invention, bending of the armature is effected by rupture of cleavable bridges. The presence of the cleavable bridges guarantees a precise positioning of the different parts constituting the armature up to the instant of rupture of these bridges.

In that case, it may, in addition, be provided that bending of the armature results in the imbrication of fingers distributed alternately on either side of the cleavable bridges.

According to another advantageous aspect of the process according to the invention, it includes a step of overmolding of the or each stator of the actuator on a base provided with means for electrical supply of the stator or stators. The base defines the relative positioning of the stators before overmolding thereof, while allowing their electrical supply. This base therefore makes it possible to obtain an overmolded actuator, therefore of low cost in large quantities, while guaranteeing a satisfactory level of reliability.

The invention also relates to a weaving system which comprises one or more of the actuators as described hereinabove or manufactured as indicated hereinabove, and to a weaving loom equipped with such a system. This system is easier to employ and maintain than the prior art devices, and allows a yarn-to-yarn control of a Jacquard loom harness. The yield of a weaving loom according to the invention is therefore substantially improved with respect to the known art.

BRIEF DESCRIPTION OF THE DRAWINGS

The invention will be more readily understood on reading the following description of an electrical rotating actuator according to its principle, with reference to the accompanying drawings, in which.

DESCRIPTION OF PREFERRED EMBODIMENTS

Figure 1:
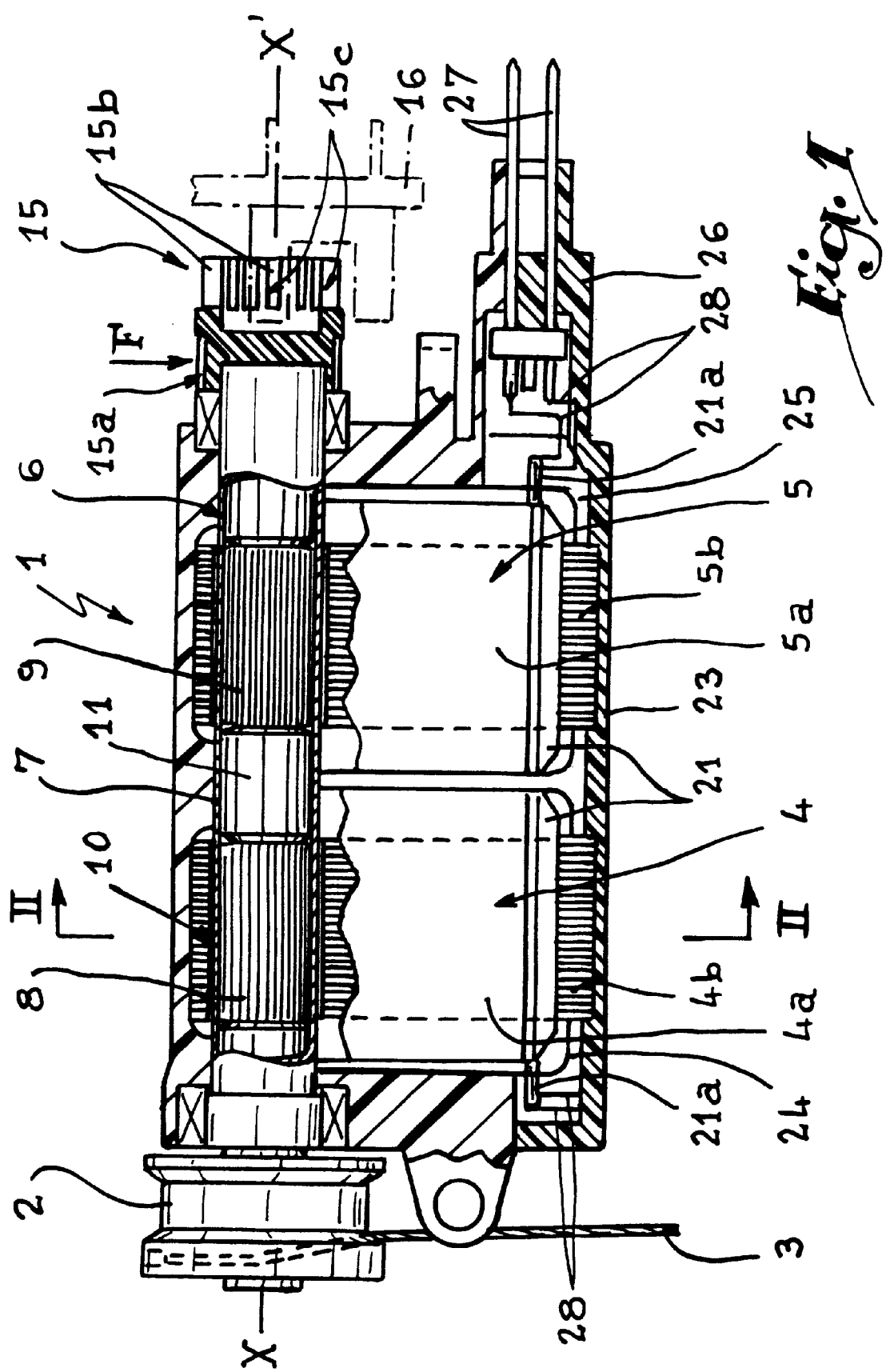
FIG. 1 is a longitudinal section through an actuator according to the invention.
Figure 2:
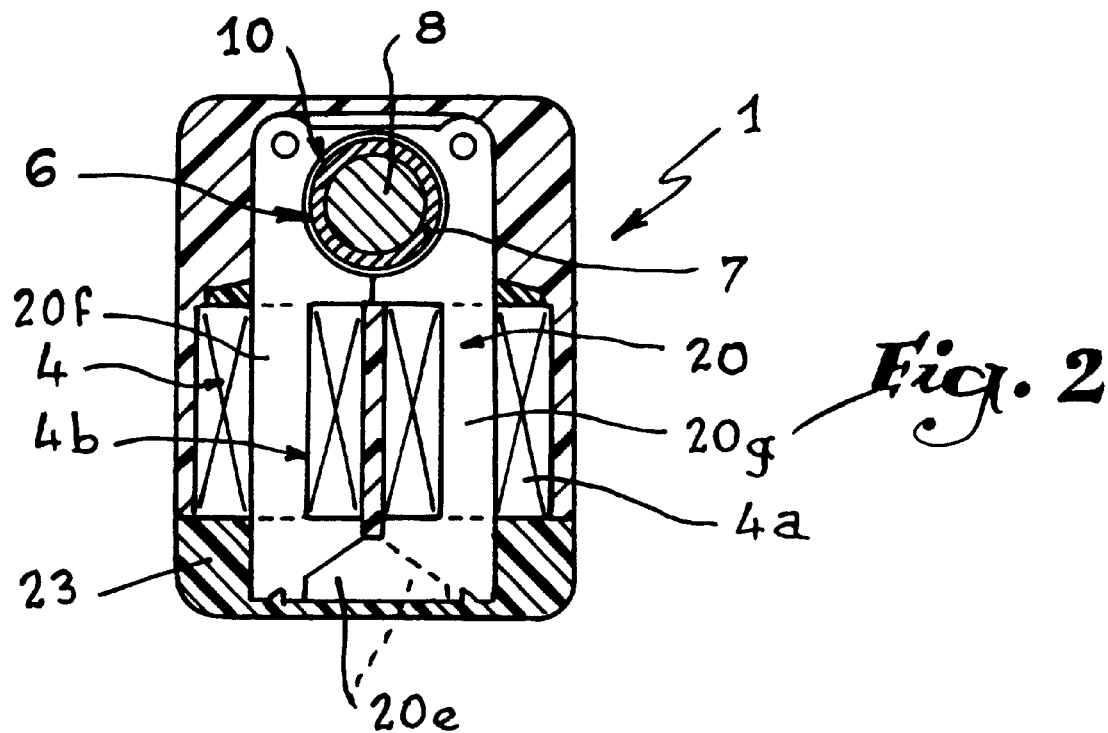
FIG. 2 is a transverse section along line II—II of FIG. 1.

Referring now to the drawings and firstly to FIG. 1, the electrical rotating actuator 1 is intended to ensure the winding, on a pulley 2, of a harness cord 3 connected to one or more warp yarns of a weaving system of Jacquard type. The actuator 1 is a two-phase actuator. It comprises a stator formed by two stator elements 4 and 5 overall aligned along an axis XX' and adapted to cooperate with a rotor 6 formed by a tube 7 centered on an axis XX'. The tube 7 is preferably made of an a magnetic material, such as for example brass. The tube 7 contains two permanent magnets 8 and 9, disposed opposite the two stator elements 4 and 5.

Elements 4 and 5 comprise windings 4a and 5a of electrically conducting wire, such as copper wire, wound around stacks 4b and 5b of magnetically conducting plates. The shape of the stacks 4b and 5b is such that they form a circular housing 10 for receiving the tube 7. The size of the housing 10 defines the air gap of the stator elements 4 and 5 with respect to the rotor 6.

Other forms of rotors, possibly provided with outer magnetized tiles, might also be incorporated in the actuator of the invention.

The rotating actuator according to the invention functions efficiently when the two magnets 8 and 9 have differently oriented polarities, the value of the angle of shift being able in principle to be included between 0 and 180°. In practice, it is included between 60 and 120°. However, the value of 90° presents, for a two-phase actuator, the additional advantage that it enables the best electromagnetic yield and an optimized start to be obtained whatever the position of stop of the actuator.

Figure 3:
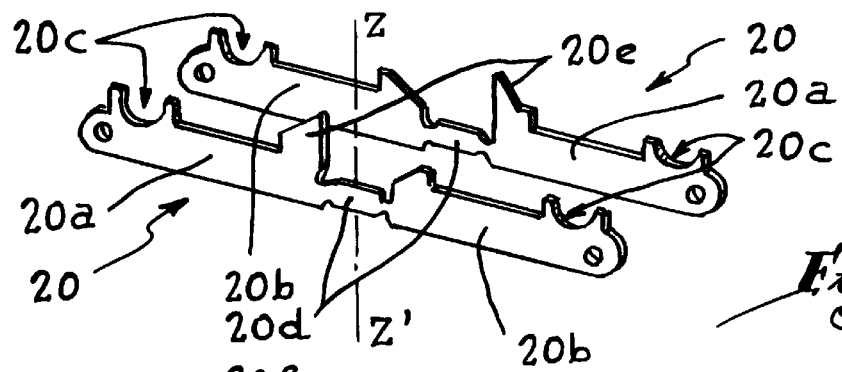
FIG. 3 is a view in perspective of two adjacent plates belonging to the armature of a stator element of the actuator of FIGS. 1 to 2.

The stacks 4b and 5b which constitute the armatures or cores of the stators 4 and 5 are formed by plates 20 which are visible, in particular, in FIG. 3. All these plates have the same geometry and comprise two parts 20a and 20b intended to be partially surrounded by the windings 4a and 5a and provided, at their ends, with a semi-circular notch 20c intended to form the housing 10. In their central part, the plates 20 comprise a cleavable bridge or tongue 20d, i.e. one which is adapted to be separated from parts 20a and 20b, for example by bending.

The part 20a of each plate 20 has a finger 20e which extends substantially perpendicularly to the bridge 20d. The other part 20b does not comprise such a finger. The plates 20 are disposed head-to-tail, i.e. side by side, one plate out of two being pivoted through 180° about an axis ZZ' which is substantially vertical in FIG. 3, with the result that each part 20a of the plates located inside the stacks 4b and 5b adjoins two parts 20b while parts 20b respectively adjoin parts 20a of the adjacent plates. In this way, the fingers 20e of the different plates extend on each side of the bridges 20d the fingers of one plate extending on one side of the bridge that it comprises, while the fingers of the two adjacent plates extend, in the same direction, on the other side of the bridges that they comprise.

A stack is formed by a variable number of plates, for example included between 12 and 50, particularly of the order of 32. When a stack 4b is formed and as is apparent in FIG. 4, the fingers 20e extend, alternately, on either side of the cleavable bridges 20d, while the notches 20c define two hollow semi-cylinders intended to form the housing 10.

Figure 5:
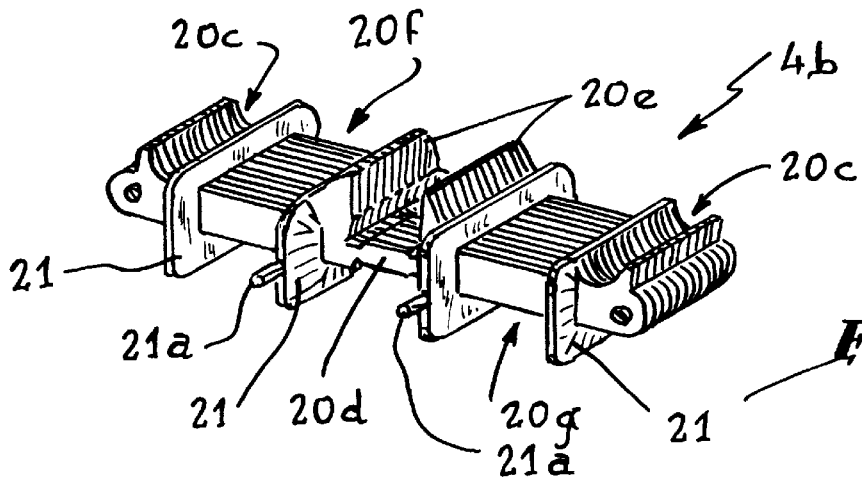
FIGS. 5 to 7 are views similar to FIG. 4, illustrating the stator element at three other successive manufacturing steps.

Manufacture of one of the stators used in the actuator of the invention includes a step in which flanges 21 made of insulating material, visible in FIG. 5, are overmoulded around the stack 4b. These flanges maintain the different plates 10 of the stack 4b in position with respect to one another and define two zones 20f and 20g for winding of the electrically conducting wire.

Certain flanges 21 bear studs 21 a around which the ends or certain intermediate parts of the wire intended to form the winding 4a, may be wound. The winding 4a is wound around the armature 4b by rotating the latter about an axis YY' shown in FIG. 6, with the result that the winding may be produced very rapidly and "flat", i.e. by rotating the stack or armature 4b about a single axis. The wire 22 passes from zone 20f to zone 20g, being wound, over at least one turn, around the studs 21a.

Figure 7:
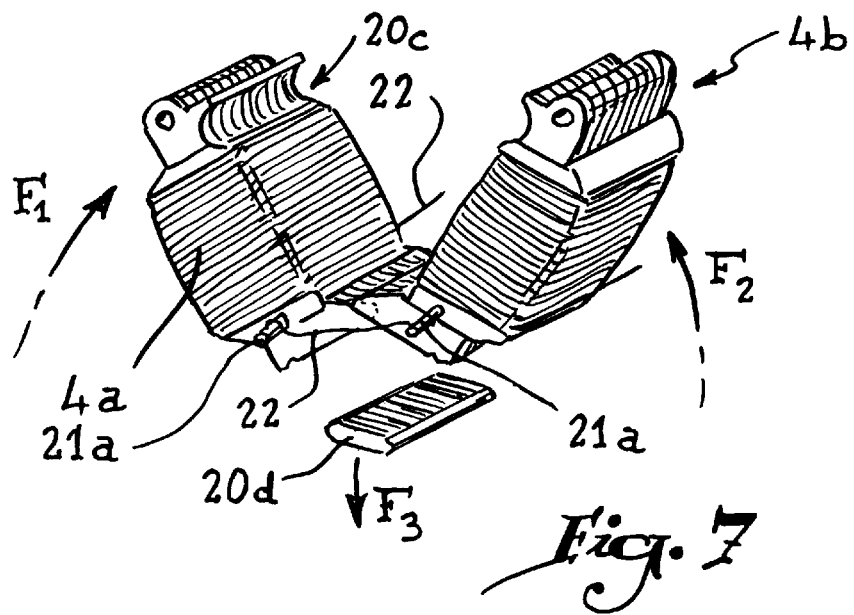

The stator element 4 may then be formed. The ends of the two halves of the winding 4a at the notches 20c, are brought closer by bending the plates 10 substantially perpendicularly to axis Y–Y', imparting to the plates 20 two forces $F_1$ and $F_2$, shown in FIG. 7. These forces $F_1$ and $F_2$ induce the rupture of the cleavable bridges 20d which are evacuated in a direction $F_3$, while the fingers 20e of the different plates 20 are imbricated in each other so as to constitute a single armature on the electromagnetic plane. In other words, the alternation of the fingers 20e disposed on each side of the cleavable bridges 20b, makes it possible to obtain, by wedging and cooperation of form, a single armature 4b formed by the stack of the plates 20. When the two halves of the stator 4 are bent down towards each other, they define, as is visible in FIG. 8, the housing. 10 for receiving the rotor 6. This housing defines the air gap of the stators 4 and 5.

Figure 4:
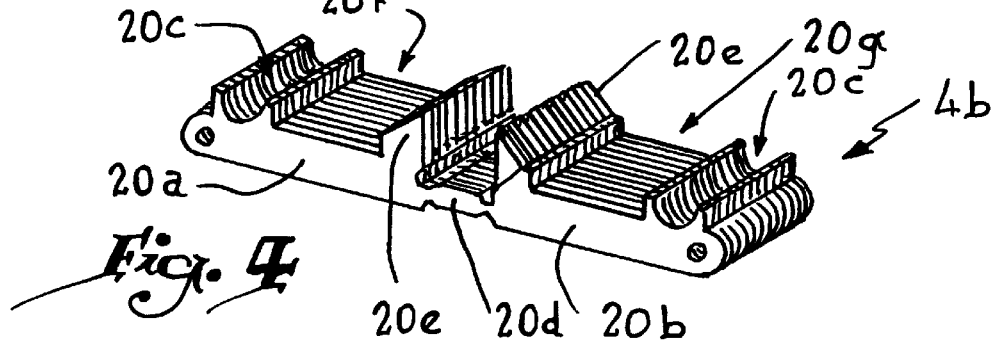
FIG. 4 is a view in perspective of a stack of plates, of the type shown in FIG. 3, intended to form the armature of a stator element, in a first manufacturing step.
Figure 6:
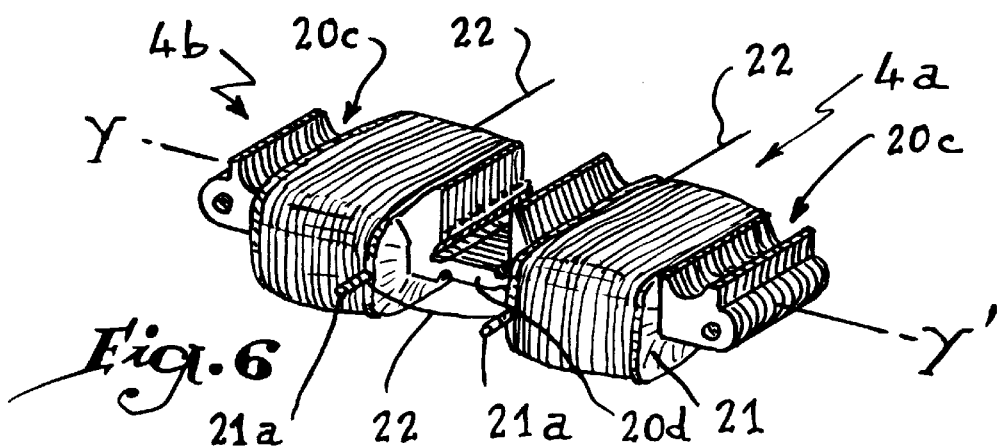

The fact that the plates 20 extend over the whole length of the armature 4b in the position of FIGS. 4 to 6, ensures that, even in the event of variation in thickness of the plates 20, a sufficient space is arranged for receiving a finger 20e between the two adjacent fingers. In fact, in the position of FIG. 7, taking into account the manufacturing tolerances, the width of the space defined between two fingers 20e belonging to two plates 20 oriented in the same way, is determined by the width of the intermediate plate located between these two plates. This width may be assumed to be equal to that of the finger that the intermediate plate bears. In this way, the width of the free space for receiving the finger of the intermediate plate is always equal to the width of this finger.

In this way, the two opposite plate parts which belong to the two halves of the armature 4b, come from the same plate. They are therefore mated and, in particular, present the same thickness.

Figure 8:
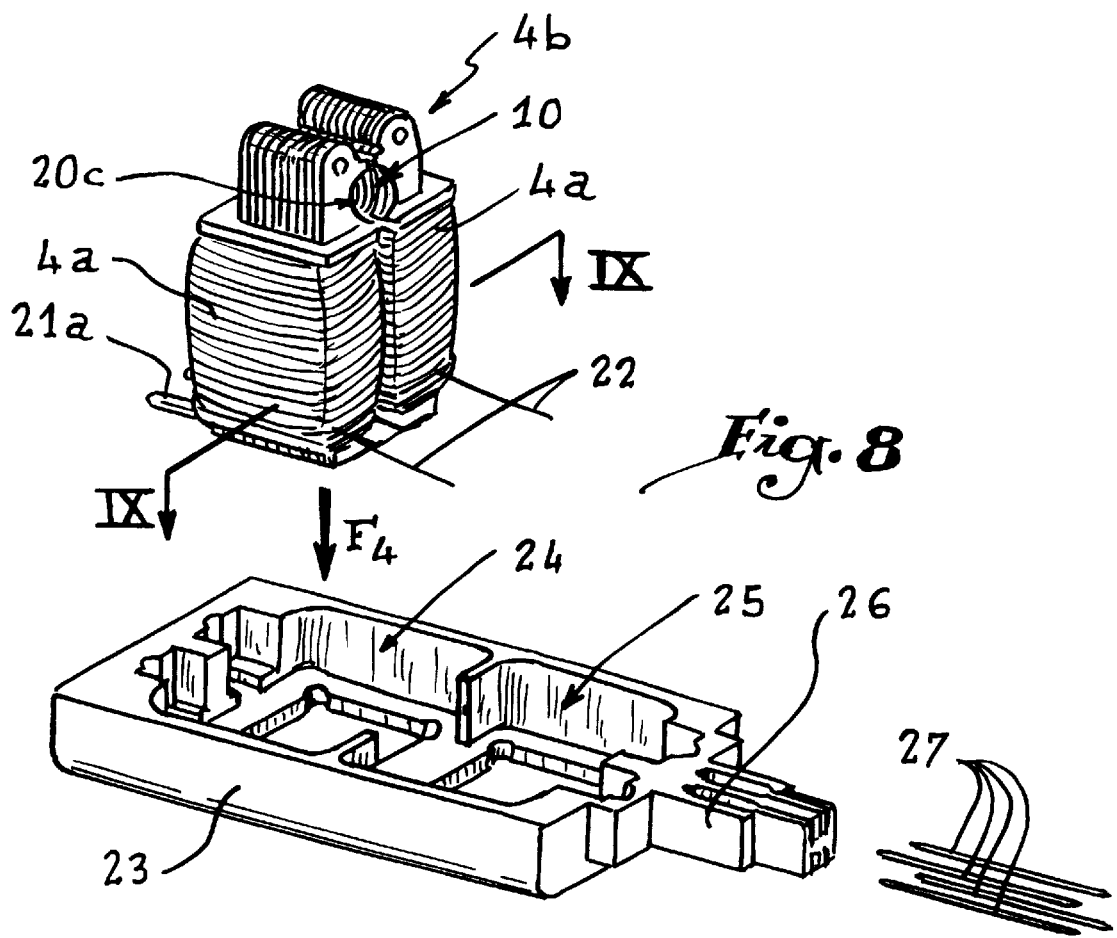
FIG. 8 is a view in perspective of the stator element obtained, shown in the course of installation on a receiving base.

FIG. 8 shows a base 23 for receiving that part of the rotor 4 opposite the part which bears the housing 10. This base 23 is provided with two housings 24 and 25 for receiving the two elements 4 and 5 forming the stator. The element 4 is positioned, in a direction $F_4$, in the base 23 while element 5 (not shown), is positioned in similar manner in the housing 25. The base 23 comprises an extension 26 adapted to receive four pins 27 for electrical supply of the stator 5. Means for electrically connecting each stator 4 or 5 with the corresponding pins 27 are constituted by electric cables moulded in the base 23, by tracks formed on the lower surface of the housings 24 and 25, or by any other equivalent means. In FIG. 1, the connection of the elements 4 and 5 with the pins 27 is shown schematically by cables 28. It will be noted that the studs 21a may serve as connection points join between the cables 28 and the wire 22.

When the two elements 4 and 5 are in place in the housings 24 and 25 of the base 23, they may be overmolded in an electrically insulating material, such as for example an elastomer, in order to constitute a monobloc, shock-resistant assembly.

Figure 9:
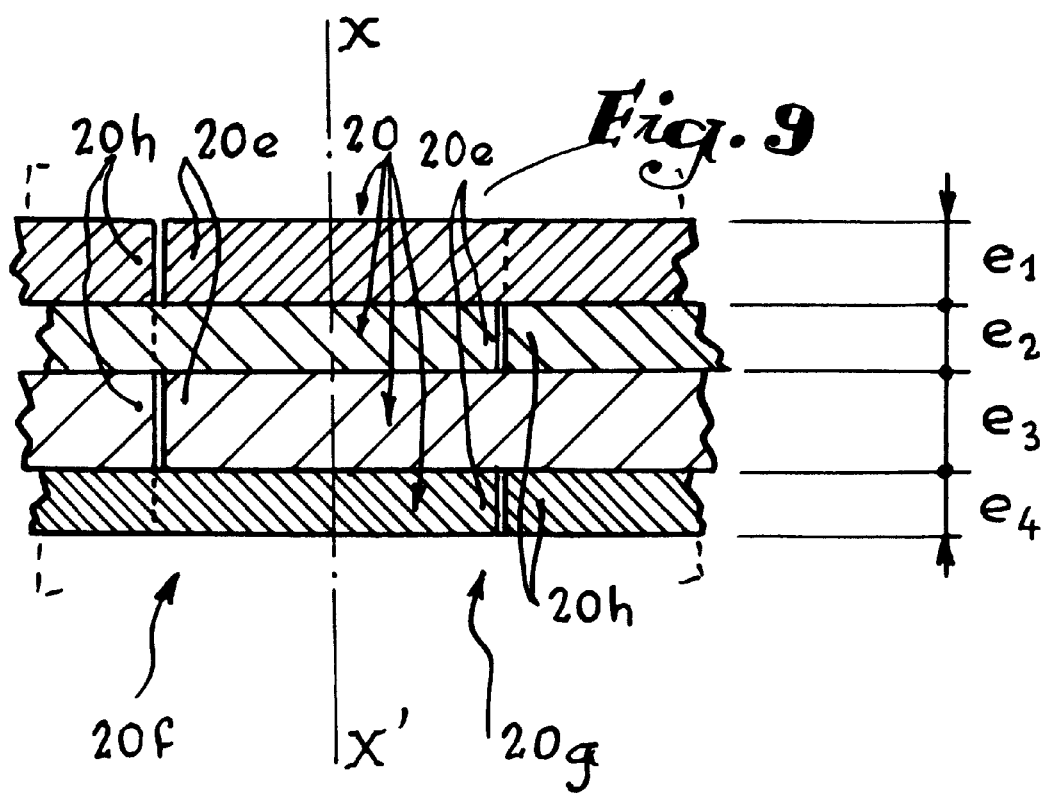
FIG. 9 is a partial schematic section of the stator element along line IX-IX of FIG. 8.

As is more clearly apparent in FIG. 9, when the stator element 4 is formed, the fingers 20e of the different plates are disposed alternately on either side of the line of axis XX' in the plane of FIG. 9. Taking into account the mode of manufacturing the stator element 4, each finger 20e is opposite a part of plate 20h which belongs to the same plate 20 before rupture of the cleavable bridge, with the result that the variations in thicknesses $e_1$, $e_2$, $e_3$ and $e_4$ of the plates 20 do not induce a defect in alignment of the elements 20e and 20h with respect to one another. Under these conditions, the electromagnetic flux optimally transits between the two zones 20f and 20g of the armature 4b.

It will be understood that the end plates of the winding zones 20f and 20g are not necessarily mated as there is no risk of wedging at their level and as the magnetic flux remains optimum in the rest of the stator element.

The actuator thus produced is very satisfactory as far as cost is concerned and functions correctly whatever the manufacturing tolerances of the plates constituting the stator elements. A large number may therefore be mounted on a Jacquard type system for forming the shed on a weaving loom.

Although it has been described essentially with reference to an actuator for a Jacquard system, the invention is also applicable to textile machines in general and, in particular, to weaving looms equipped with dobby, for controlling the heddle frames, or to hosiery machines for controlling the needles.

What is claimed is:

1. A method of forming a stator for an electrical rotating device including the steps of:

forming a plurality of generally flat armature plates having first and second sections integrally connected by a severable bridge and such that each plate includes a lateral projection extending from said first section adjacent the severable bridge and with semi-circular laterally projecting notches adjacent outermost ends of each of the first and second sections;

arranging the plurality of plates in side-by-side aligned relationship with the first section of every other plate being abutted with the second section of every other plate to thereby form a stack of plates having first and second end portions separated by a plurality of severable bridges;

winding an electrically conducting wire about said first and second end portions of the stack to form spaced electrical coils; and forming an armature by urging the first and second end portions toward one another about the severable bridges to thereby align the semi-circular notches of the first and second sections to create a tubular housing for receiving a rotor adjacent one end of the armature and to imbricate the lateral projections extending from the first sections of the armature plates adjacent an opposite end of the armature.

2. The method of claim 1 wherein the severable bridges are severed from the armature plates during the urging of the first and second end portions toward one another.

3. The method of claim 2 including the additional step of providing a base having an open housing of a size to receive the armature;

electrically connecting the coils to electrical supply contacts carried by the base; and overmolding the armature within the housing of the base.

4. The method of claim 3 including the additional step of securing the arranged stack of armature plates by applying insulated flanges about said stack prior to winding of the electrical coils.

* * * * *